United States Patent [19]

Asher et al.

[11] 4,201,691
[45] May 6, 1980

[54] LIQUID MEMBRANE GENERATOR

[75] Inventors: William J. Asher, Fanwood; Hsue C. Tsien, Chatham, both of N.J.

[73] Assignee: Exxon Research & Engineering Co., Florham Park, N.J.

[21] Appl. No.: 869,837

[22] Filed: Jan. 16, 1978

[51] Int. Cl.² .......................... A61K 35/14; B01F 3/00; B01J 13/02
[52] U.S. Cl. .................................. 252/314; 435/182; 252/307; 252/359 R; 252/359 A; 261/DIG. 26; 424/101
[58] Field of Search ............... 252/359 R, 359 A, 306, 252/314, 302, 303, 304; 261/DIG. 26; 264/4

[56] References Cited

U.S. PATENT DOCUMENTS

| | | | |
|---|---|---|---|
| 3,423,489 | 1/1969 | Arens et al. | 264/4 |
| 3,464,926 | 9/1969 | Vandegaer et al. | 264/4 X |
| 3,728,280 | 4/1973 | Sauer et al. | 252/359 R X |
| 3,812,056 | 5/1974 | de la Torriente et al. | 252/359 R X |
| 3,816,331 | 6/1974 | Brown, Jr. et al. | 252/359 R X |
| 3,900,420 | 8/1975 | Sebba | 252/314 X |
| 3,962,383 | 6/1976 | Hagiwara et al. | 252/359 R X |

FOREIGN PATENT DOCUMENTS 723624  2/1955  United Kingdom .................... 264/4

*Primary Examiner*—Joseph Scovronek
*Attorney, Agent, or Firm*—E. A. Forzano; Joseph J. Allocca

[57] ABSTRACT

An apparatus is disclosed for generating a multiple phase dispersion and distributing said multiple phase dispersion as globules in a suspension phase. The apparatus comprises a conduit for introducing a first fluid under pressure into a first zone including a porous fluid dispersing layer. This first zone is in fluid communication with a second zone through the porous fluid dispersing layer. The second zone has introduced into it a second fluid under pressure through inlets. The first fluid is dispersed as bubble-like micro droplets in the second fluid by passage from the first zone through the fluid dispersing layer into the fluid in the second zone. An outlet zone is in contact with the second zone and comprises a perforated nonporous layer having an outer and inner surface and includes a porous flow distribution layer substantially in contact with the inner second zone facing surface of the nonporous layer. The multiple phase dispersion formed in the second zone enters the outlet zone through the porous flow distribution layer and exits the outlet zone as globules of predetermined size through the perforations where the outer surface of said perforated nonporous layer forms an interface with a suspension phase which is immiscible with the second fluid.

The instant invention further relates to a process for generating multiple phase dispersions as globules in a suspension phase.

26 Claims, 3 Drawing Figures

SCHEMATIC FLOW DIAGRAM OF LIQUID MEMBRANE GENERATOR

FIG. IA
LIQUID MEMBRANE GENERATOR DIAGRAM
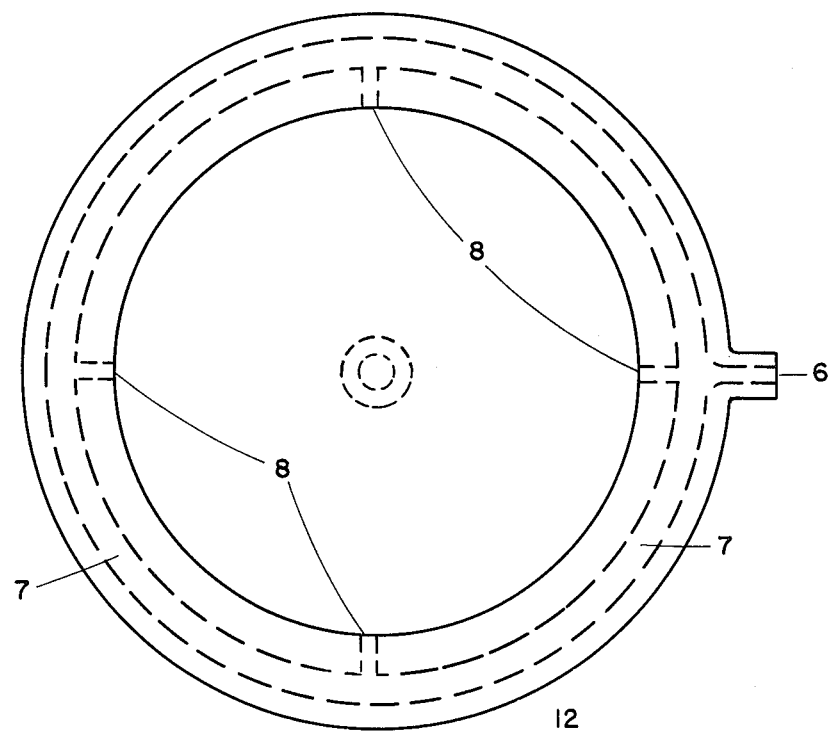
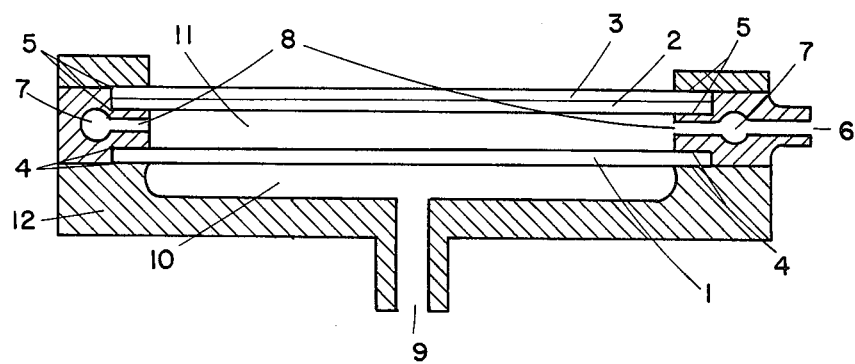
FIG. IB

SCHEMATIC FLOW DIAGRAM OF LIQUID MEMBRANE GENERATOR

4,201,691

LIQUID MEMBRANE GENERATOR

BRIEF DESCRIPTION OF THE INVENTION

The instant invention relates to both an apparatus and a method for generating a multiple phase dispersion and distributing said multiple phase dispersion as globules in a suspension phase or medium. In its preferred embodiment, the instant invention comprises an apparatus and a process for generating a three phase liquid membrane system wherein a two phase dispersion or foam is distributed as globules in a suspension phase.

BRIEF DESCRIPTION OF THE DRAWINGS

FIG. 1 represents the one embodiment of the apparatus of the instant invention. View A of FIG. 1 represents the top view of this particular embodiment while view B represents the cross-sectional side view of this embodiment.

SUMMARY OF THE PRIOR ART

Figure 2:
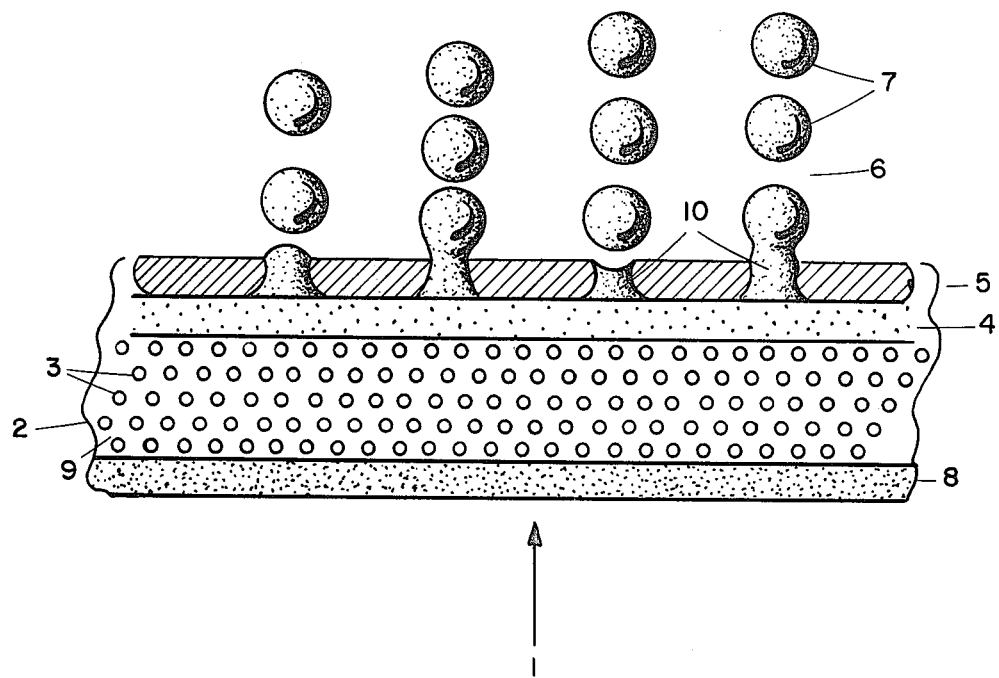
FIG. 2 represents a schematic representation of one embodiment of the apparatus of the instant invention.

There are a number of ways to make multiple phase dispersions comprising at least three phases, and in particular liquid membrane formulations. Below are discussed prior art methods for formulating liquid membrane formulations that are illustrative for the formulation of multiple phase emulsions in general.

A liquid membrane formulation is one comprising an interior phase surrounded by an exterior or membrane phase, suspended as a globule in a suspension medium. The membrane phase must be substantially immiscible with both the interior phase and the suspension phase so as to isolate the interior phase from the suspension phase. Further, this membrane phase is permeable to selective species for controlled permeation into the interior phase or out of the interior phase.

The methods for generating liquid membrane formulations fall basically into two categories. The method described in U.S. Pat. No. 3,389,078 presents a process that generates only single shell liquid membranes. In that process, the interior phase is bubbled through a layer of membrane phase so that the membrane phase encloses the bubble of the interior phase. The membrane coated bubble of the interior phase is then passed into the suspension medium. This method is only practical for single shell liquid membranes of about 5000 micron diameter or greater.

Another process, as described in the article, *How to Design Liquid Membrane Separations,* E. L. Cussler and D. F. Evans, Separation and Purification Methods, 3(2), 399–421 (1974), comprises forming a two phase dispersion of the exterior and the interior phase in one vessel using an apparatus such as a blender, and adding with mixing this two phase dispersion to another mixing apparatus containing the suspension medium to form the globules of dispersion. This process is inefficient since it requires two mixing vessels and the transferring of fluids from one vessel to another. If one is working with a two phase dispersion having a very short lifetime, it may be very difficult, if not impossible, to transfer the two phase dispersion to the suspension medium before the dispersion breaks up. There is also the problem of the range of globule sizes achievable by this process. The size of the globule formed is a function of the shear to which it is subjected—the higher the shear the smaller the globule. Many commonly used shear devices create a wide range of shear. Consequently, a wide range of globule sizes will result. Further, if one desires the formation of a large percentage of small globules, since many shear devices have this wide range of shear, it is highly probable that in order to achieve the desired small globules, the globules will be subjected to a shear sufficient to cause an undesirable amount of breakage.

Another method of forming the single shell liquid membranes is described in a publication entitled *Fluorocarbon Liquid Membranes For Blood Oxygenation,* the Final Report of June 30, 1971-Feb. 28, 1973, authored by William J. Asher, Herbert W. Wallace, Marc T. Zubrow, Peter Stein and Helen Brooks, sponsored by The National Heart and Lung Institute, National Institute of Health, Bethesda, Md. 20014. This method utilizes two concentric hypodermic tubes to form the single shell liquid membranes. The inner hypodermic tube forms the inside bubble of interior phase as the outer concentric tube simultaneously forms the exterior phase of the single shell liquid membrane. These hypodermic tubes are placed in the suspension phase so as the globules are formed, they are simultaneously suspended in the suspension phase. This method of formulation is not preferred since the apparatus is very difficult to fabricate. The flow rate through these tubes is very restricted whereby the globule diameters are limited to about 1000 microns or larger.

The instant invention overcomes the difficulties of the prior art. Since there is a very short elapsed time between the formation of the two phase dispersion and the formation of the globules, one can form liquid membrane globules of dispersion too unstable for the globule formation processes of the prior art. Further, this apparatus can form liquid membrane globules of emulsions or single shell liquid membranes depending upon the formulation used. The range of the globule sizes are much smaller than those created by the processes of the prior art, without a commensurate degree of breakage resulting.

The apparatus of the instant invention first forms the dispersion or foam by passage of a first fluid through a porous layer into a second fluid. This dispersion or foam is then passed through a porous flow distribution layer and through a perforated nonporous layer. This passage of the dispersion from the flow distribution layer through the perforated layer and into a suspension phase causes the formation and substantially even distribution of globules in the suspension phase.

Foam generators are known in the art for example, where a fluid is passed through a porous layer into an immiscible fluid forming a dispersion. Although such generators were known one apparatus was not known for both the formation of the dispersion and the even distribution of the dispersion as globules of a predetermined size range in the suspension phase.

DETAILED DESCRIPTION OF THE INVENTION

The instant invention relates to an apparatus for generating a multiple phase dispersion and distributing said multiple phase dispersion as globules in a suspension phase, said apparatus comprising: a means for introducing a first fluid under pressure; a first zone including a porous fluid dispersing layer, for receiving said first fluid, said first zone being in fluid communication with a second zone through said porous fluid dispersing layer; a means for introducing a second fluid under pressure into said second zone; said second zone for receiving said second fluid wherein said first fluid is dispersed as bubble-like microdroplets in said second fluid by passage through said fluid dispersing layer; an outlet zone comprising a perforated non-porous layer having an outer and inner surface, said outlet zone including a porous flow distribution layer which is substantially in contact with said inner surface of said nonporous layer; said second zone being in fluid communication with said outlet zone, wherein said multiple phase dispersion formed in the second zone enters the outlet zone through the porous flow distribution layer and exits said outlet zone as globules of predetermined size through said perforations where the outer surface of said perforated nonporous layer forms an interface with a suspension phase immiscible with said second fluid.

The instant invention further relates to a process for generating a multiple phase dispersion and distributing said multiple phase dispersion as globules in a suspension phase, said process comprising: passing a first fluid through a porous fluid dispersing layer into a second fluid substantially immiscible with said first fluid so that a multiple phase dispersion is formed by dispersing said first fluid into a second fluid; passing said multiple phase dispersion through an outlet zone comprising a perforated substantially nonporous layer having an outer and inner surface, said inner surface being in substantial contact with a porous flow distribution layer, and said outer surface forming an interface with a suspension phase, said suspension phase being substantially immiscible with said second phase, wherein said multiple phase dispersion passes through said porous flow distribution layer, then through said perforated nonporous layer and into said suspension phase.

As noted above, the instant invention relates to the generation of a multiple phase dispersion and the distribution of this dispersion resulting in substantially spherical globules in a suspension phase or medium. According to the instant invention, a first fluid is dispersed as bubble-like microdroplets in a second fluid. The second fluid is thus the exterior phase of the dispersion and the first fluid is the interior phase of the dispersion. In order to form a dispersion these two fluids must be substantially immiscible with each other. This dispersion is then passed through an outlet zone comprising a perforated substantially nonporous layer in substantial contact with a porous flow distribution layer. This dispersion passes through the porous flow distribution layer first, then through the perforated nonporous layer into the suspension phase where the dispersion is distributed as globules. To accomplish this result, the suspension phase must be substantially immiscible with the second fluid, i.e. the exterior phase of the dispersion.

The first fluid may be a gas or a liquid. The second and suspension phases are preferentially liquids. However, the suspension phase may be a gas. In the art prior to this invention it has been very difficult to form a multiple phase liquid membrane system with gaseous continuous suspension phase, which would, of course, allow effective treatment of the gas with liquid membranes. Prior art techniques have been inadequate. The apparatus of the instant invention allows practical formation of liquid membrane systems with a gas suspending phase thus allowing the effective treatment of a gas phase with liquid membrane globules. In this embodiment, the first phase is either liquid or gas and the second membrane phase a liquid.

It is also possible for the first fluid to be a dispersion. The second fluid must then be immiscible with the exterior phase of the first fluid's dispersion. Consequently, it is possible to form a dispersion with more than two phases for distribution as globules in a suspension phase. A multiple phase dispersion as herein utilized is defined as the first fluid distributed as bubble-like microdroplet in the second fluid, i.e. the continuous phase. The formation of two phase dispersion for globule distribution is preferred, however, as in the formation of a three phase liquid membrane system. For suggested compositions and uses of three phase liquid membrane systems, U.S. Pat. No. 3,779,907 is hereby incorporated by reference to aid the practitioner in formulating these systems in conjunction with the instant invention. As is known to those skilled in the art these liquid membrane globules can be utilized for either the controlled release of materials from the interior phase of the globule into the suspension phase or for removing and trapping materials from the suspension phase in the interior phase of the globules. In either case, the materials in question permeate the exterior or membrane phase of the emulsion. The application incorporated by reference above explains this in detail. It is not the intention in listing specific applications of three phase liquid membrane systems, to limit the process to those specific embodiments. Those skilled in the art can formulate other applications.

Briefly, the instant invention comprises forming a multiple phase dispersion by passing one fluid through a porous layer into another fluid and passing this dispersion through another porous layer, then through a substantially nonporous perforated layer so that dispersion globules are formed as the dispersion enters the suspension phase from the perforated layer. The critical aspects of the invention, which include the passage of the dispersion through the second porous layer and through the substantially nonporous perforated layer, are described in greater detail below.

As noted above, the passing of a fluid through a porous material dispersing it into another fluid is known in the art. The instant invention may utilize any type of porous material as long as the porous material does not chemically alter the fluid utilized, have its pore structure altered out of the useful range by the fluid used and passes through all the desired components of the fluid. The pore sizes of this layer, of course, depend upon the requirements of the practitioner but typically range between about $100\mu$ and $0.1\mu$, preferably between about $50\mu$ and $1\mu$, and most preferably between about $20\mu$ and $2\mu$. As used herein, the pore size is defined as the size of the particle, 98% of which will be removed from an aqueous solution containing said particles when passed through the porous layer, a frequently used method to characterize pore size of porous materials.

Since it is necessary during the practice of the instant invention to pass fluids through porous materials it is necessary that a positive pressure differential be maintained to promote the flow of the fluids in question as described above. Consequently, it is desirable that the apparatus of the instant invention be capable of containing pressurized fluids without any undesirable leakage. Any technique known in the art that accomplishes this result may be utilized as long as it is compatible with the other requirements of the instant process or apparatus.

The instant invention can comprise a single container divided into separate chambers by the layers of porous materials described above. Since, at certain points, it is preferable that the fluids flow through the porous layers in order to enter the next zone, it is desirable that any extraneous leakage from one zone into the next zone also be minimized. The apparatus may also comprise a series of separate containers, each constituting a different zone, with a series of fluid communication means joining the chambers in the proper sequence. These suggested embodiments for the apparatus are merely illustrations. Those skilled in the art may utilize any equivalent techniques in the practice of the instant invention.

As noted above, the fluids are introduced and maintained under pressure in order to promote their flow in the desired direction. The means for introducing a fluid under pressure into the desired zone may be through any type of inlet joint or equivalent apparatus allowing the introduction of a pressurized fluid into a chamber with a minimum of leakage. Similarly, the fluid may be pressurized by any method known in the art. For example, a gas used as the first fluid can be introduced into the first zone directly from the pressurized tank in which it is stored.

It should also be noted that the residence time of the dispersion in the second zone should be such that the dispersion does not substantially coalesce. This can be accomplished by a number of techniques. For example, the flow rate can be increased so as to shorten the residence time of the dispersion in the second zone. Also, the volume of the second zone in relation to the fluid flow can be reduced to shorten the residence time of the dispersion in that zone. The length of residence time in the second zone is most critical for the more unstable dispersion formulations.

As noted above, the critical aspect of the invention comprises the passage of the multiple phase dispersion through a second porous material, the flow distribution layer, just prior to the dispersions passing through the substantially nonporous perforated layer into the suspension phase. It has been unexpectedly discovered that this porous flow distribution layer is critical for the even distribution of the dispersion as globules from the perforated layer into the suspension phase. Without this porous flow distribution layer, the dispersion would exit from the perforations at an uneven rate and, in fact, may not even exit from some perforations at all. This flow distribution layer also causes these globules to be of a narrower size limitation range than would otherwise be achievable. In this way, as much as 90% of the globules can be within a diameter ratio of 2 to 1 of the largest to the smallest. In order to achieve these results, the flow distribution layer must be in direct and substantial contact with the substantially nonporous perforated layer so that the dispersion does not distribute itself along the interface of the flow distribution layer and the nonporous perforated layer. Or stated differently, there can be no fluid communication between the perforations of the nonporous layer at the interface of the flow distribution means and the nonporous layer. The lack of fluid communication between the perforations at this interface results in the more even distribution of the multiple phase dispersion through the perforated layer resulting in the narrow globule size ranges described above. This close contact can be achieved in a number of ways. The porous flow distribution means can be attached to the perforated nonporous layer and can be bonded to that layer in all areas of contact. This bonding is not an absolute requirement and in no case should the bonding film occur in the areas where the liquid would flow through the perforations of the nonporous layer thereby inhibiting the flow through the perforations. It is preferable that this porous flow distribution layer be substantially uniform in thickness so that there is an equal distribution of multiple phase dispersion through the perforated layer. Otherwise, if there is a differential in the thickness of the flow distributing means communicating with the perforations in the nonporous layer, the flow will be distributed into the suspension phase in a satisfactory manner but the flow rate of the globules from each perforation will depend upon the thickness of the flow distribution layer it is in communication with. As the flow rate through each perforation is inversely proportional to the thickness of the flow distribution means in communication with it, the thicker the flow distribution means the slower the dispersion flow from that perforation and so on. Thus, to achieve an even distribution of flow from each perforation the flow distribution means should be substantially equal in thickness.

In order to achieve these results the flow distribution layer must cause a certain pressure differential in relation to the pressure differential caused in the formation of the globules as they leave the perforations of the nonporous layer. This requirement will be discussed in greater detail below. The flow distribution layer is preferably a porous material and can be chosen from a wide range of substances depending upon the fluids and the process conditions chosen. Just as the first porous layer must be chemically inert to the fluids with which it is in contact, the flow distribution layer must also be chemically inert to the fluids with which it has contact.

The substantially nonporous perforated layer of material is substantially impermeable to the fluids utilized in the apparatus, i.e. under the conditions of use substantially all of the dispersion passes through the perforations rather than through the nonperforated area. Where the substantially nonporous layer of material comprises a layer of material having an outer surface and an inner surface, the inner surface is that surface forming an interface with the flow distribution layer. The outer surface of the outlet zone is that surface that contacts the suspension phase. As said layer of nonporous material is perforated each perforation can be viewed as a passageway or channel separately communicating with the fluid distribution layer and the suspension phase through orifices. Thus, the dispersion flows through the flow distribution layer into these passageways of the nonporous layer and enters the suspension phase as dispersion globules through said orifices. The nonporous layer should also be chemically inert to the fluids utilized. Preferably, the nonporous layer of material should be of substantially uniform thickness parallel to the direction of flow.

As noted above, each perforation in the nonporous layer comprises a channel or passageway in fluid communication with the flow distribution layer and the suspension phase. Each passageway defines an orifice at each surface of the nonporous perforated layer. These passageways are presently described in greater detail.

There are a number of parameters defining the passageways in the nonporous layer. These include the angle of the passageways, the geometric configuration of the passageways, as well as the orifice the passageway defines at both the inner and outer surfaces of the nonporous layer. Although it is theoretically possible that the passageways form any angle with the interface of the flow distribution means, it is preferable that this angle be substantially perpendicular with the interface of the flow distribution layer. The geometric configuration of the passageways can be defined by the cross-sections made at the passageways. The passageways may conform to any conceivable shape or configuration. Preferably, however, the passageways should form a regular configuration. For example, the cross-section of the passageways parallel to the flow can be rectangular, trapezoidal, a shape having convex curves in the walls narrowing the walls of the passageway relative to the orifice, etc. The preferred shape is the convex configuration with the orifice at the inner surface of the nonporous layer being larger than the orifice at the outer surface of the nonporous layer. Another method of defining the passageways is by describing the cross-sectional area perpendicular to the direction of flow. Again theoretically, these cross-sections can conform to any conceivable geometric shape. The preferred shapes are circular, rectangular, triangular and elliptic. The most preferred are circular and elliptic. The walls of the passageways can be rough or smooth but it is preferred that the walls of the passageways be as smooth as possible thereby offering as little resistance and disrupting force as possible to the dispersion flow.

Depending upon the needs of the practitioner the passageways can have substantially equal volumes and shapes, but the practitioner can modify these parameters as he requires. It is preferred that the pore size of the passageway be larger than the average bore size of the flow distribution layer to equate the pressure along the passageway.

As noted above, the passageways make an orifice with each surface of the nonporous layer with which it intersects. These orifices can form a sharp edge with these surfaces or a smooth edge. It is preferable that a sharp edge be formed by this intersection at the outer surface of the nonporous layer.

Again the size and shape of these orifices can vary widely. For example, the shape of these orifices can be circular, elliptic, rectangular, triangular, etc. The preferred shapes are elliptic and circular. The orifice area in relation to the entire outer surface area of the nonporous layer, i.e. that surface in contact with the suspension is less than about 20% of the area, preferably less than 5% of the entire surface area, and most preferably less than 1%. These calculations consider the entire outer surface area of the outlet zone to include the area of the orifices as well and that the separate orifices are substantially equally spaced. Again, the practitioner can choose the conditions most suitable to his needs. The diameter of the orifices in the outlet zone can range between about 3000 and 10 microns, preferably between about 500 and 50 microns, and most preferably between about 400 and 100 microns. It should also be noted that the pores of the flow distributing layer should be smaller than the orifices made at the surface of the nonporous layer.

During operation the nonperforated area outer surface of the perforated, nonporous layer forms an interface with the suspension phase, i.e. the nonperforated area of the perforated, nonporous layer is wet by the suspending phase. A zone of wetting by the suspending phase of a portion of the nonperforated area should occur between most of the perforations.

It has also been found that it is preferable that the surface of the nonporous layer in contact with the suspension phase be constructed of material that is preferably wetted by the suspending phase. As known to those skilled in the art, a contact angle of less than 90° will be formed by a liquid which preferably wets a surface. If this surface is not preferably wetted by the suspending phase it can be treated to make it so. For instance, you can treat the surface with a protein such as Fibrinogen and this will enhance its wettability of that surface by an aqueous suspension phase. It is preferable to conduct the treatment by submerging the perforated, nonporous layer alone into a solution of fibrinogen (0.01 to 0.1 mg/ml of physiological saline) and dilute the concentration of fibrinogen by a factor of about 100 before removing this layer from the solution interface. This procedure prevents a protein film from forming which bridges across the orifices formed by the perforations which can substantially inhibit the flow through the perforations. The following treatments can be utilized when the suspension phase is non-aqueous: polyperfluoroethylene, silicone oils, hydrocarbon waxes and hydrocarbon oils. The materials that are preferably wetted by aqueous solutions include the following suitable polymers with polar bonds (Nylon). Two materials that are preferentially wetted by non-aqueous solutions are the following: polyethylene and Teflon, are useable with the appropriate pretreatment. Again, it is not intended that these lists be exhaustive, only illustrative.

It should be presently noted that in another embodiment a number of steps may be eliminated from the instant invention. This is due to the commercial availability of stable two phase dispersions. Consequently, it would not be necessary to disperse the first fluid into the second fluid by passing the first fluid through the porous fluid dispersing layer. Thus, the introduction of dispersion directly into a zone, for passage through the flow distribution layer and through perforated nonporous layer would cause the formation of the globules in suspension phase.

In order to enjoy the benefits of the instant invention to the greatest extent, it is necessary for the practitioner to adequately coordinate a number of interrelated variable parameters of the instant invention. As these parameters are interrelated, the practitioner can choose any number of schemes to select the range of these variable parameters. Below a suggested scheme is presented but those skilled in the art may substitute equivalent ones.

At the outset the practitioner selects the following: the chemical make-up of the suspension phase, the chemical make-up of the emulsion, the conditions of deployment (i.e. the temperature, pressure), the overall flow rate, that is, the flow rate from the apparatus into the suspension phase, and the size of the orifices at the outside surface of the nonporous layer.

Once these parameters are set, it is possible to determine the requirements of the porous flow distribution layer. The parameter utilized to select the flow distribution layer is the pressure differential of that layer. For a given fluid under specific conditions the pressure differential adequately defines a porous layer of material. The pressure differential, $\Delta P$, measures the pressure drop of a given fluid through the porous material. This can be measured by using a differential pressure gauge, that is, a pressure gauge that has pressure communication points on either side of the layer and thus is able to measure the pressure drop experienced by a pressurized fluid flowing through a given porous material. As noted above, a pressure differential will differ under the conditions of the permeation, i.e. the fluid, the structural characteristics of the porous material, the thickness of the particular porous material and so on.

It has been determined that for the instant invention to work adequately the working range of the pressure differential for the flow distribution layer (FDL), $\Delta P_{FDL}$, should have the following relationship to the static pressure differential associated with an orifice of average size and shape of those formed in the outside surface of the perforated nonporous layer, $\Delta P_{outlet}$, the relationship defined as the ratio $\Delta P_{FDL}/\Delta P_{outlet} \leq 0.25$. Preferably, $\Delta P_{FDL}/\Delta P_{outlet}$ ranges between 0.25 to 100. Most preferably the ratio $\Delta P_{FDL}/\Delta P_{outlet}$ ranges between 1.0 to 10.0. This differential pressure is either measured or calculated for static rather than flow conditions. Experimentally, a sample of this material can be mounted with the outside surface in contact with the suspending phase and the second fluid passed very slowly through the perforations from the other side of the layer. When the second fluid bulges through the orifice to the extent that the interface between the second and suspension fluids is substantially perpendicular to the nonperforated surface of the perforated layer, the flow is stopped and the difference in pressure of the two phases measured. This is the $\Delta P_{outlet}$. It is usually most convenient to calculate this static differential pressure. The equation is $\Delta P_{outlet} = \gamma C/A$, where $\gamma$ is the interfacial tension between the second and suspension fluids, C is the circumference of a typical orifice in the outlet surface, and A is the area of a typical orifice on the outlet surface.

Since the parameters such as the emulsion composition, pressure, etc. were fixed above, the flow distribution layer can be chosen to satisfy the requirements cited above for the conditions chosen. One can choose a variety of porous materials, according to pore sizes, thicknesses, etc. The practitioner can choose a particular layer that fits his needs, that is, of a certain pore structure, certain thickness, etc. but in any event all these parameters must be chosen so that the pressure differential for that flow distributing layer satisfies the relationships with the pressure differential of the outer orifices of the non-porous layer as given above.

Once the flow distribution layer is chosen, the porous fluid dispersing layer can be chosen in accordance with the following criteria. It is preferable that the average pore size of the fluid dispersing layer be no larger than the average pore size for the flow distribution layer. Most preferably, these average pore sizes are about the same. It is possible, however, that the average pore sizes of the fluid dispersing layer be larger than the average pore size of the flow distribution layer, even as much as twice or four times as much, but this is not preferred.

The flow rates of the first fluid into the first zone and the second fluid into the second zone will be adjusted according to the make-up of the dispersion desired. If one desires the volumetric ratio of the dispersion to be 2 to 1, first fluid to second fluid, he will adjust the flow rates of the first fluid entering the first zone to be twice that of the second fluid entering the second zone. Similar adjustments will be made for compositions having a different ratio of components.

Finally, it should be noted that although the apparatus and process are directed to the formation of multiple phase disperion globules, miscible fluids may also be used in conjunction with the instant invention for the purpose of mixing them and distributing the resultant joint fluid in a third fluid. This, however, is not the preferred embodiment.

FIG. 1 represents one particular embodiment of the instant invention. View A of FIG. 1 represents the top view of this embodiment while view B represents the cross-sectional side view of this embodiment. This apparatus will function as follows: the first fluid is introduced through inlet port 9, into the first zone 10 formed by the housing 12 and porous fluid dispersing layer 1, the second fluid is introduced into the second zone 11 through inlet port 6 by passage through the circular fluid communication means 7, through the input ports 8. As the first fluid passes through the porous fluid dispersion layer 1, into the second zone, the first fluid is dispersed in the second fluid in the second zone. This dispersed fluid is then passed through the porous flow distribution layer 2, and through the substantially nonporous perforated layer 3, (perforations not shown) so that the dispersion is distributed as globules in the suspension phase when the nonporous perforated layer forms an interface with a suspension phase. The fluid dispersion layer is sealed to the housing at 4. The flow distribution means and the nonporous perforated layer are sealed to the housing at 5.

FIG. 2 is a schematic flow diagram of one embodiment of the liquid membrane generator. The first fluid is passed from 1 through the porous fluid dispersion layer 8, into the second zone 2 forming bubble-like microdroplets 3 of the first fluid in said second fluid 9. This multiple phase dispersion is then passed through a porous flow distribution means 4 and through the channels 10 through a nonporous layer 5, thereby forming globules 7 of the multiple phase dispersion in the suspension phase 6. These figures present a particular embodiment of the instant invention. Their purpose is to illustrate and not limit the invention.

EXAMPLE

An experiment was performed with a liquid membrane generator where the fluid dispersion layer was porous stainless steel, grade H, available from Pall Trinity Micro Corporation, Cortland, N.Y. This grade H is characterized by the manufacturer as a pore size of $2\mu$ when characterized by the 98% removal criteria established above. This grade H is further characterized by the manufacturer as having absolute removal of $12\mu$ particles when filtering liquids and when filtering gases, removal pore sizes of $0.4\mu$ and $1.0\mu$ for removing 98% and absolute removal respectively. It is also given a mean pore size of $5\mu$. This grade H material used was 1/32 of an inch thick and had a circle of 1 cm in diameter exposed to flow. The flow distribution layer, located about 1/16 inch above the first layer was a grade G porous stainless steel from the same manufacturer. This grade was characterized by 98% removal of $3\mu$ particles when filtering liquids. It was also characterized by the manufacturer as having absolute removal of $15\mu$ particles from liquids. When filtering gases, particle sizes for 98% and absolute removal were given as $0.7\mu$ and $1.8\mu$ respectively. It was also characterized as having a $10\mu$ mean pore size. A layer of this G material 1/16 of an inch thick was used. It was bonded to a nonporous perforated layer without covering the orifices of the perforations with Eastman 910 cyanoacrylic cement diluted with trichloroethylene (Eastman Chemicals, Kingsport, Tenn.). The nonporous perforated layer was electroformed nickel, grade 15T, available from Veco Stork International, Charlotte, North Carolina. It had pores on the surface in contact with the suspending phase of 330μ in diameter on a 1670μ pitch with a passageway area of 3.5 percent of the total area. The pores on the surface adjacent to the flow distribution layer were larger. The surface of this perforated layer contacting the suspending phase was pretreated with a fibrinogen solution as described above.

These two layers had a circular area of 1 cm in diameter exposed for operation as was the case with the fluid dispersion layer. The first fluid used in this example was gaseous oxygen flowing through the apparatus at a 203 ml/min flow rate at ambient temperature and sufficient pressure. The second fluid was FC-47 fluorocarbon introduced into the second zone at a rate of 0.75 ml/min. FC-47 is a tradename for $(C_4F_9)_3N$, perfluortributylamine, from 3M Company, Saint Paul, Minnesota. Bovine blood plasma was the suspending phase in a column above the liquid membrane generator. Liquid membrane encapsulated oxygen bubbles of about 1000μ in diameter with a membrane thickness of about 0.6μ were made which rose up the column containing the plasma maintained at ambient temperature and pressure. These encapsulated bubbles were then displaced by additional plasma flow to a separate container for collapse.

What is claimed is:

1. An apparatus for generating a multiple phase emulsion and distributing said multiple phase emulsion as globules in a suspension phase, said apparatus comprising:

means for introducing a first fluid under pressure into a first zone;

said first zone including a porous fluid dispersing layer having a pore size ranging between about 100μ and 0.1μ for receiving said first fluid and dispersing said first fluid in a second zone through said porous fluid dispersing layer;

means for introducing a second fluid under pressure into said second zone;

said second zone for receiving said second fluid and said dispersed first fluid from said first zone with which said second fluid is immiscible, wherein said first fluid is dispersed in said second fluid as bubble-like microdroplets in said second fluid by passage of said first fluid through said fluid dispersing layer, thereby forming a multiple phase dispersion;

an outlet zone comprising a perforated, substantially nonporous layer having an outer and inner surface, each perforation forming a communicative passageway through the nonporous layer between the outer and inner surfaces of said nonporous layer and forming orifices at the inner and outer surfaces of said nonporous layer, which orifices have a diameter ranging between about 3000 and and 10 microns, said outlet zone including a porous flow distribution layer which is in substantial contact with said inner surface of said nonporous layer, the pores of which flow distribution layer are smaller than the diameter of the orifices at the surface of the nonporous layer, said second zone being in fluid communication with said outlet zone through the perforated substantially nonporous layer, wherein said multiple phase dispersion formed in said second zone enters the outlet zone through the porous flow distribution layer and exits the outlet zone as globules of a predetermined size range through said perforated nonporous layer, the outer surface of said perforated nonporous layer forming an interface with the suspension phase which suspension phase is immiscible with said second fluid, wherein the pressure differential at the conditions of employment of said flow distribution layer is greater than or equal to 0.25 times the static pressure differential of an orifice of the communicative passageway of average size and shape formed at the outer surface of the nonporous layer.

2. The apparatus of claim 1 wherein the outer surface of said outlet zone is preferentially wetted by said suspension phase.

3. The apparatus of claim 2 wherein the orifices formed on the outer surface of the nonporous layer are substantially circular, having a diameter of between about 500 microns and 50 microns, wherein the area of said orifices make up less than about 20% of the total outer surface area of the nonporous layer.

4. The apparatus of claim 3 wherein each perforation in the nonporous layer forms a passageway from the outer surface of said nonporous layer to the inner surface of said nonporous layer, wherein the cross-section of said passageways form convex walls as viewed from inside said passageways.

5. The apparatus of claim 1 wherein the pore size of said flow distribution layer ranges between about 10 and 0.5 microns and the average pore size of said fluid dispersion means ranges between about 2 and 0.5 microns.

6. An apparatus for generating a multiple phase emulsion and distributing said multiple phase emulsion as globules in a suspension phase, said apparatus comprising:

means for introducing a multiple phase emulsion under pressure into a receiving zone;

an outlet zone in fluid communication with said receiving zone comprising a perforated, substantially nonporous layer having an outer and inner surface, each perforation forming an orifice at the outer and inner surfaces of said nonporous layer, which orifices have a diameter ranging between about 3000 and 10 microns, said outlet zone including a porous flow distribution layer which is in substantial contact with the inner surface of said perforated nonporous layer, the pores of which flow distribution layer are smaller than the diameter of the orifices at the surface of the nonporous layer, wherein the multiple phase dispersion from the receiving zone enters the outlet zone through the porous flow distribution layer and exits said outlet zone as globules of a predetermined size range through said perforations where the outer surface of said nonporous layer forms an interface with said suspension phase immiscible with said multiple phase dispersion, wherein the pressure differential at the conditions of employment of said flow distribution layer is greater than or equal to 0.25 times the static pressure differential of an orifice of average size and shape formed at the outer surface of the nonporous layer.

7. An apparatus of claim 6 wherein the pore size of the flow distribution layer is equal to or greater than the microdroplet size in the multiple phase emulsion.

8. A process for the generation and distribution of a multiple phase dispersion as globules in a suspension phase, said process comprising passing a first fluid through a porous fluid dispersing layer, having a pore size ranging between about 100μ and 0.1μ, into a second fluid, said second fluid being substantially immiscible with said first fluid so that a multiple phase dispersion is formed comprising microdroplets of the first fluid dispersed in the second fluid; passing said multiple phase dispersion through an outlet zone comprising a perforated, substantially nonporous layer having an outer and inner surface, each of said perforations forming an orifice at the outer and inner surfaces of said nonporous layer, which orifices have a diameter ranging between about 3000 and 10 microns, said inner surface being in substantial contact with a porous flow distribution layer, the pores of which flow distribution layer are smaller than the diameter of the orifices at the surface of the nonporous layer, the outer surface of the nonporous layer forming an interface with the suspension phase, said suspension phase being substantially immiscible with said second fluid, wherein the pressure differential of said flow distribution is greater than or equal to 0.25 times the static pressure differential of an orifice of average size and shape formed at the outer surface of the nonporous layer, whereby said multiple phase dispersion passes through said porous flow distribution layer then through said perforated nonporous layer and into said suspension phase as globules.

9. The process of claim 8 wherein the outer surface of said outlet zone is preferentially wetted by said suspension phase.

10. The process of claim 9 wherein the pressure differential at the conditions of deployment of said flow distribution layer is from 1.0 to 10 times the static pressure differential of an orifice of average size and shape formed at the outer surface of the nonporous layer.

11. The process of claim 9 wherein said suspension phase is a liquid.

12. The apparatus of claim 1 wherein the porous fluid dispersing layer has a pore size ranging from between about $50\mu$ to $1\mu$.

13. The apparatus of claim 1 wherein the porous fluid dispersing layer has a pore size ranging from between about $20\mu$ and $2\mu$.

14. The apparatus of claim 1 wherein the perforated nonporous layer orifices have a diameter ranging between about 500 microns and 50 microns.

15. The apparatus of claim 1 wherein the perforated nonporous layer orifices have a diameter ranging between about 400 microns and 100 microns.

16. The apparatus of claim 12 wherein the perforated nonporous layer orifices have a diameter ranging between about 500 microns and 50 microns.

17. The apparatus of claim 13 wherein the perforated nonporous layer orifices have a diameter ranging between about 500 microns and 50 microns.

18. The apparatus of claim 12 wherein the perforated nonporous layer orifices have a diameter ranging between about 400 microns and 100 microns.

19. The apparatus of claim 13 wherein the perforated nonporous layer orifices have a diameter ranging between about 400 microns and 100 microns.

20. The apparatus of claim 6 wherein the perforated nonporous layer orifices have a diameter ranging between about 500 microns and 50 microns.

21. The apparatus of claim 6 wherein the perforated nonporous layer orifices have a diameter ranging between about 400 microns and 100 microns.

22. The process of claim 8 wherein the porous fluid dispersing layer has a pore size ranging from between about $20\mu$ and $2\mu$.

23. The process of claim 8 wherein the perforated nonporous layer orifices have a diameter ranging between about 500 microns and 50 microns.

24. The process of claim 8 wherein the perforated nonporous layer orifices have a diameter ranging between about 400 microns and 100 microns.

25. The process of claim 22 wherein the perforated nonporous layer orifices have a diameter ranging between about 500 microns and 50 microns.

26. The process of claim 22 wherein the perforated nonporous layer orifices have a diameter ranging between about 400 microns and 100 microns.

* * * * *